(12) United States Patent
Hintzer et al.

(10) Patent No.: US 8,969,500 B2
(45) Date of Patent: Mar. 3, 2015

(54) MELT-PROCESSIBLE FLUOROPOLYMERS HAVING LONG-CHAIN BRANCHES, METHODS OF PREPARING THEM AND USES THEREOF

(75) Inventors: Klaus Hintzer, Kastl (DE); Harald Kaspar, Burgkirchen (DE)

(73) Assignee: 3M Innovative Properties Company, St. Paul, MN (US)

( * ) Notice: Subject to any disclaimer, the term of this patent is extended or adjusted under 35 U.S.C. 154(b) by 714 days.

(21) Appl. No.: 12/597,022

(22) PCT Filed: Apr. 24, 2008

(86) PCT No.: PCT/US2008/061424
§ 371 (c)(1),
(2), (4) Date: Oct. 22, 2009

(87) PCT Pub. No.: WO2008/140914
PCT Pub. Date: Nov. 20, 2008

(65) Prior Publication Data
US 2010/0121012 A1 May 13, 2010

(30) Foreign Application Priority Data

May 11, 2007 (GB) .................................. 0709033.5

(51) Int. Cl.
| | | |
|---|---|---|
| C08F 216/12 | (2006.01) | |
| C08F 214/18 | (2006.01) | |
| C08F 236/20 | (2006.01) | |
| C08K 5/09 | (2006.01) | |
| C08K 5/42 | (2006.01) | |

(52) U.S. Cl.
CPC ............. *C08F 214/18* (2013.01); *C08F 236/20* (2013.01); *C08K 5/09* (2013.01); *C08K 5/42* (2013.01)
USPC ............ 526/247; 526/242; 526/254; 526/255

(58) Field of Classification Search
USPC ......... 526/247, 251, 252, 242, 255, 254, 249, 526/336
See application file for complete search history.

(56) References Cited

U.S. PATENT DOCUMENTS

| | | | |
|---|---|---|---|
| 2,409,274 A | | 10/1946 | Hanford et al. |
| 4,612,357 A | | 9/1986 | Bekiarian et al. |
| 4,910,276 A | * | 3/1990 | Nakamura et al. ............ 526/247 |
| 5,132,368 A | | 7/1992 | Chapman, Jr. |
| 5,312,882 A | * | 5/1994 | DeSimone et al. ........... 526/201 |
| 5,464,904 A | | 11/1995 | Chapman, Jr. |
| 5,585,449 A | * | 12/1996 | Arcella et al. ................ 526/247 |
| 5,612,419 A | * | 3/1997 | Arcella et al. ................ 525/252 |
| 6,046,368 A | | 4/2000 | Lamanna et al. |
| 6,221,987 B1 | * | 4/2001 | Sugiyama ..................... 526/231 |
| 6,927,265 B2 | * | 8/2005 | Kaspar et al. ................. 526/249 |
| 2004/0192868 A1 | | 9/2004 | Kaspar et al. |
| 2004/0260022 A1 | * | 12/2004 | Amos et al. ................... 525/123 |
| 2007/0015937 A1 | | 1/2007 | Hintzer et al. |
| 2011/0172338 A1 | | 7/2011 | Murakami |

FOREIGN PATENT DOCUMENTS

| | | |
|---|---|---|
| EP | 0 759 447 | 2/1997 |
| EP | 0 879 839 | 11/1998 |
| EP | 1 189 953 | 7/2004 |
| JP | S63-238115 | 10/1988 |
| JP | 2524123 B2 * | 8/1996 |
| JP | 2002-12626 | 1/2002 |
| WO | WO 99/37598 | 7/1999 |
| WO | WO 00/75092 | 12/2000 |
| WO | WO 2004/094491 | 11/2004 |
| WO | WO 2004/111124 | 12/2004 |
| WO | WO 2006/031316 | 3/2006 |
| WO | WO 2006/073918 | 7/2006 |

OTHER PUBLICATIONS

Machine translation of JP 2524123 B2, Feb. 2013.*
Sugiyama, "Perfluoropolymers Obtained by Cyclopolymerization and Their Applications", *High Performance Polymers for Diverse Applications, Modern Fluoropolymers, Wiley Series in Polymer Science*, Chap. 28, pp. 541-555 (1997).
Bagnall, R.D., et al., "New Inhalation Anaesthetics: I. Fluorinated 1,3-Dioxolane Derivatives," *Journal of Fluorine Chemistry*, vol. 9, (1977) p. 359-375.
Boyer, Cyrille, et al., "Iodine Transfer Polymerization (ITP) of Vinylidene Fluoride (VDF). Influence of the Defect of VDF Chaining on the Control of ITP," *Macromolecules*, vol. 38 (2005) p. 10353-10362.
Galimberti, Marco, et al., "New Catalytic Alkylation of In Situ Generated Perfluoro-Alkyloxy-Anions and Perfluoro-Carbanions," *Journal of Fluorine Chemistry*, vol. 126 (2005) p. 1578-1586.
Garcia-Franco, Cesar A., et al., "Similarities Between Gelation and Long Chain Branching Viscoelastic Behavior," *Macromolecules*, vol. 34, No. 10 (2001) p. 3115-3117.
LaZerte, J.D., et al., "Pyrolyses of the Salts of the Perfluoro Carboxylic Acids," *Journal of the American Chemical Society*, vol. 75, Issue 18, (1953) p. 4525-4528.
Malmberg, A., et al., "Long-Chain Branching in Metallocene-Catalyzed Polyethylenes Investigated by Low Oscillatory Shear and Uniaxial Extensional Rheometry," *Macromolecules* vol. 35, No. 3 (2002) p. 1038-1048.
Millauer, Hans, et al., "Hexafluoropropene Oxide—A Key Compound in Organofluorine Chemistry," *Angewandte Chemie International Edition*, vol. 24, No. 3, (1985) p. 161-179.
Mizukado, Junji, et al., "Reactions of Aliphatic Fluoro-Alcohols with $CHClF_2$ at Atmospheric Pressure," *Journal of Fluorine Chemistry*, vol. 127 (2006) p. 400-404.

(Continued)

*Primary Examiner* — Nicole M Buie-Hatcher
(74) *Attorney, Agent, or Firm* — Julie Lapos-Kuchar; Christopher M. Geise

(57) ABSTRACT

The present disclosure describes fluoropolymers having long chain branches and methods of making these fluoropolymers. These fluoropolymers may have improved melt processing properties. Shaped articles containing these fluoropolymers are also provided.

12 Claims, 1 Drawing Sheet

(56) References Cited

OTHER PUBLICATIONS

*Modern Fluoropolymers*, ed. John Scheirs, Wiley Science, 1997.
Murata, Junji, et al., "Selective Synthesis of Fluorinated Ethers by Addition Reaction of Alcohols to Fluorinated Olefins in Water," *Green Chemistry*, vol. 4 (2002) p. 60-63.
Ragazzini, C., et al., "Copolymerization of Ethylene and Chlorotrifluoroethylene by Trialkylboron Catalysts," *European Polymer Journal*, vol. 3 (1967) p. 129-136.
Shroff, R.N. and H. Mavridis, "Assessment of NMR and Rheology for the Characterization of LCB in Essentially Linear Polyethylenes," *Macromolecules*, vol. 34 (2001) p. 7362-7367.
Shroff, R.N. and H. Mavridis, "Long-Chain-Branching Index for Essentially Linear Polyethylenes," *Macromolecules*, vol. 32 (1999) p. 8454-8464.
Stange, Jens, et al., "Linear Rheological Properties of the Semifluorinated Copolymer Tetrafluoroethylene-Hexafluoropropylene-Vinylidenfluoride (THV) with Controlled Amounts of Long-Chain Branching," *Macromolecules*, vol. 40 (2007) p. 2409-2416.
Tuminello, W.H., "Molecular Weight and Molecular Weight Distribution From Dynamic Measurements of Polymer Melts," *Polymer Engineering and Science* vol. 26, No. 19 (1986) p. 1339-1347.
Tuminello, W.H., "Chapter 6: Relating Rheology to Molecular Weight Properties Polymers," *Encyclopedia of Fluid Mechanics* vol. 9, Polymer Flow Engineering of p. 209-242, 1991.
Wood-Adams, Paula M. and John M. Dealy, "Effect of Molecular Structure on the Linear Viscoelastic Behavior of Polyethylene," *Macromolecules* vol. 33 (2000) p. 7489-7499.
Yanagida, Shozo, et al., "Reactions of Perfluoro-2-Methyl-2-Pentene with Carboxylic Acids, Alcohols, and some Cyclic Amides. A New Fluorinating Reagent," *Bulletin of the Chemical Society of Japan*, vol. 54, No. 4, (1981) p. 1151-1158.
Zeifman, Yu V., et al., "The Chemistry of Perfluoroisobutene," *Russian Chemical Reviews*, vol. 53, No. 3, (1984) p. 256-273.
PCT International Search Report, PCT/US2008/061424.

\* cited by examiner

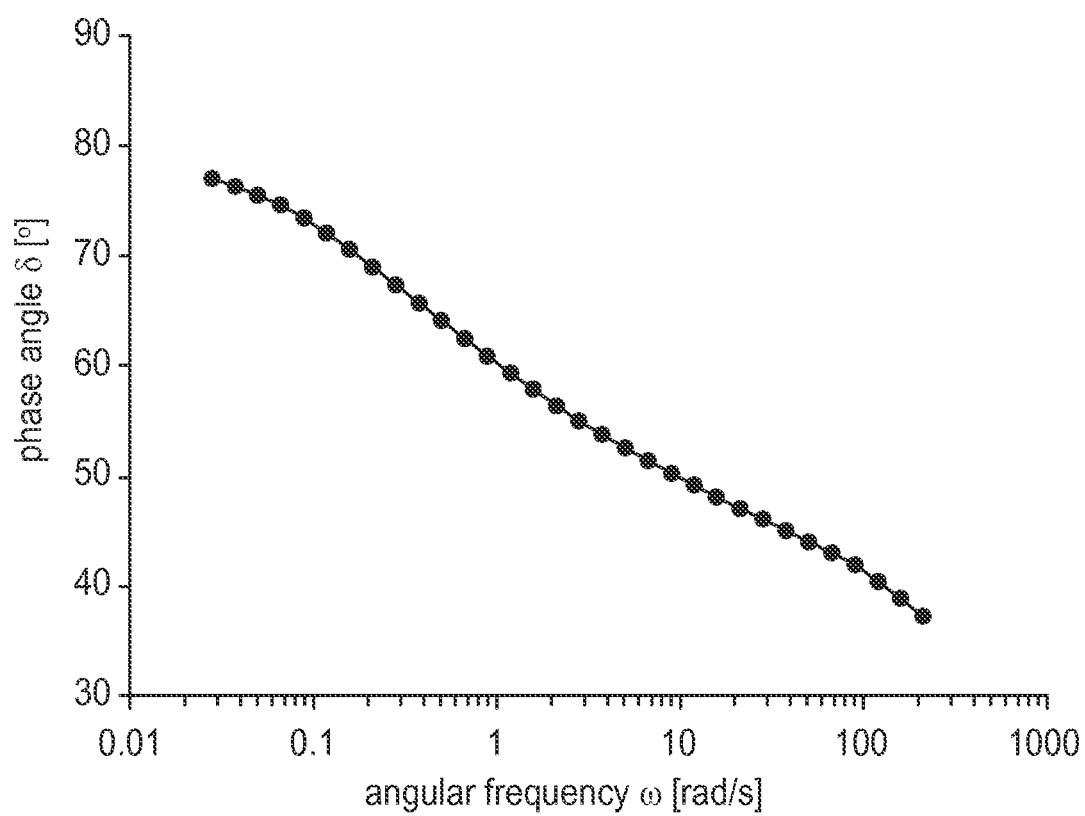

MELT-PROCESSIBLE FLUOROPOLYMERS HAVING LONG-CHAIN BRANCHES, METHODS OF PREPARING THEM AND USES THEREOF

CROSS REFERENCE TO RELATED APPLICATIONS

This application is a national stage filing under 35 U.S.C. 371 of PCT/US2008/061424, filed Apr. 24, 2008, which claims priority to Great Britain Application No. 0709033.5 filed May 11, 2007, the disclosure of which is incorporated by reference in its/their entirety herein.

FIELD OF THE INVENTION

This invention relates to a method for preparing fluoropolymers having long chain branches. Such polymers may have improved melt processing properties, for example, in their extrusion into shaped articles or in their extrusion into coatings. The invention also relates to methods of making these fluoropolymers and to shaped articles containing said polymers.

BACKGROUND OF THE INVENTION

Fluoropolymers have been used in a variety of applications because of their desirable properties such as heat resistance, chemical resistance, weatherability, UV-stability etc. Various applications of fluoropolymers are described, for example, in "Modern Fluoropolymers", edited by John Scheirs, Wiley Science 1997. Fluoropolymers include homopolymers and copolymers of a fluorinated or non-fluorinated olefin.

Fluoropolymers include melt-processible and non-melt-processible polymers. For example, polytetrafluoroethylene (PTFE) and copolymers of tetrafluoroethylene (TFE) with small amounts (for example, not more than 0.5% by weight) of a comonomer are generally not melt-processible with conventional equipment used for the processing of thermoplastic polymers because of their high molecular weights and high melt viscosities (about $10^7$ Pa*s at a melting point of about 380° C.). Melt-processible fluoropolymers can be obtained from various fluorinated monomers and/or combinations of fluorinated and non-fluorinated monomers. Depending on the monomers used in the preparation melt-processible fluoropolymers may be perfluorinated or partially fluorinated. Melt-processible polymers can be processed with equipment typically used for the processing of thermoplastic polymers, such as molding, injection molding, coating or extrusion.

The rate of extrusion of melt-processible fluoropolymers is limited to the speed at which the polymer melt undergoes melt fracture. This may be important in thermoforming processes such as wire and cable extrusion, film extrusion, blown film extrusion, injection molding etc. If the rate of extrusion exceeds the rate at which melt fracture occurs (known as critical shear rate), an undesired rough surface of the extruded article may be obtained.

Using an extrusion die with a relatively large orifice and then drawing the extruded melt to the desired final diameter may increase the process rate of the melt processible fluoropolymer. Herein, the melt draw is commonly characterized by the draw down ratio calculated as the ratio of the cross-sectional area of the die opening to the ratio of the cross-sectional area of the finished extrudate. To obtain a high draw down ratio, for example, in the order of up to 100, the polymer melt should exhibit a sufficiently high elongational viscosity. Otherwise the cone stability of the polymer melt in the extrusion will be insufficient, which results in undesired diameter variations of the extruded article as well as frequent cone-breaks.

Accordingly, there exists a continuous need for fluoropolymers that can be melt-processed at higher shear rates and that have a high elongational viscosity. Various attempts have been made in the art to obtain such fluoropolymers or to obtain fluoropolymers that can be faster processed.

A known approach in the art is to substantially broaden the molecular weight distribution of the fluoropolymer thereby increasing the shear rate. However, the gain in critical shear rate is usually to the expense of weaker overall mechanical properties.

An alternative approach is to tailor the topography of the fluoropolymers by using specific modifier molecules leading to the formation of branched rather than linear polymers. This approach has been described, for example, in WO2004/094491, WO2006/031316 and U.S. Pat. No. 4,612,357. These modifiers are typically olefins containing one or more halogen, typically bromine or iodine, which can be easily detached from the chain during radical polymerization. However, the formation of bromine or iodine containing products may require subsequent process steps to further stabilize the polymer.

In JP 2002/012626 aliphatic perfluorinated divinyl ethers have been described as modifiers generating long chain branches. However, aliphatic vinyl ether chains have been found to be labile when submitted to high pH environments. Therefore, precautions have to be taken in down stream processes and work up proceedings. Additionally, aliphatic divinyl ethers are rather expensive raw materials leading to increased process costs.

SUMMARY OF THE INVENTION

There is still a need for fluoropolymers having good thermal stability, good melt-processing and mechanical properties and that can be prepared by an efficient and economic process. There is also still a need for alternative modifiers and methods for preparing non-linear fluoropolymers, that is, fluoropolymers having long chain branches. Desirably, the fluoropolymers are not labile and withstand a wide range of work up procedures. Ideally, the modifiers are easily incorporated into the fluoropolymers and are efficient in the generation of branched polymers having long side-chains. Desirably, the fluoropolymers can be melt-processed at high shear rates and have a high elongational viscosity.

It has now been found that fluoropolymers having long chain branches and good rheological properties can be prepared using bisolefinic modifiers.

Therefore, in one aspect, there are provided fluoropolymers derived from at least (a) one or more fluorinated monoolefin monomers and
(b) one or more fluorinated bisolefin monomers of the general formula

  (I),

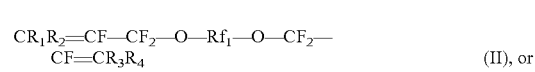  (II), or

  (III)

with
X and Y being independently from each other
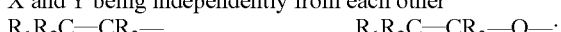
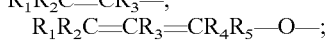
$R_1$, $R_2$, $R_3$, $R_4$ and $R_5$ being independently from each selected from $Rf_1$, F or H;

Rf₁ being selected from the group consisting of Rf₂ or being a linear or branched perfluoroalkyl, perfluoroalkyl ether or perfluoroalkyl polyether residue and Rf₂ being a non-fluorinated or a fluorinated or a perfluorinated aryl which (in addition to the olefinic moieties) may be non-substituted or substituted with
one or more halogens other than F;
one or more perfluorinated alkyl residue;
one or more perfluorinated alkoxy residue;
one or more perfluorinated poly oxy alkyl residue;
one or more fluorinated, perfluorinated or non-fluorinated phenyl or phenoxy moieties or combinations thereof, and wherein the phenyl or phenoxy residues may be non-substituted or substituted with one or more perfluorinated alkyl, alkoxy or polyoxy alkyl residue or one or more halogens other than F or combinations thereof;
n and m being independent from each other integers of from 0 to 6 with the proviso that n and m are not both 0.

In another aspect, there are provided methods for making fluoropolymers, said methods comprising polymerizing one or more fluorinated monoolefins in the presence of one or more fluorinated bisolefins, said bisolefins having the general structure represented by formula (I), (II) or (III) above.

In a further aspect there is provided a shaped article containing the fluoropolymers, said article being selected from the group consisting of blow-molded articles, extruded articles and injection-molded articles.

DESCRIPTION OF THE FIGURE

FIG. 1 shows the plot of the phase angle ($\delta$) versus the angular frequency ($\omega$) of the polymer obtained in the experiment described in example 2 and measured as described in the method section.

DETAILED DESCRIPTION OF THE INVENTION

Fluorinated Bisolefins

It has been found that fluorinated bisolefins of the general structure shown below are responsible for the generation of long chain branches into the polymer structure. Such branches are known in the art as long chain branches or "LCBs". The fluorinated bisolefins believed to be responsible for the generation of long chain branches are in the following also referred to as 'modifiers'.

The fluorinated bisolefins provided herein are of the general formula $$CR_1R_2=CF-(CF_2)_n-O-(CF_2)_m-CF=CR_3R_4 \quad (I),$$

$$CR_1R_2=CF-CF_2-O-Rf_1-O-CF_2-CF=CR_3R_4 \quad (II), \text{ or}$$

$$X-Rf_2-Y \quad (III).$$

In formula (I) and (II) $R_1$ to $R_4$ may be the same or different and represent F or H.

Rf₁ represents a residue selected from the group consisting of linear or branched perfluoroalkyl, perfluoroalkyl ether or perfluoroalkyl polyether residues or a residue according to Rf₂.

Rf₂ represents a non-fluorinated, a fluorinated or a perfluorinated aryl. The aryl may be non-substituted (apart from the two olefinic residues, which it links) or it may be (additionally to the two olefinic residues) substituted. Suitable substituents may be one or more linear or branched perfluorinated alkyl, alkoxy or polyoxy alkyl residue and combinations thereof.

Other suitable substituents include halogens other than F, such as Cl, Br or I with Cl being preferred.

Yet further suitable substituents include one or more fluorinated, perfluorinated or non-fluorinated phenyl or phenoxy residue. The phenyl or phenoxy residue may be non-substituted or substituted with or one or more linear or branched perfluorinated alkyl, alkoxy or polyoxy alkyl residue or a combination thereof. Additionally or alternatively, the phenyl or phenoxy residues may also be substituted with one or more halogens other than F, such as Cl, Br or I with Cl being preferred.

n and m in formula (I) represent independent from each other integers of from 0 to 6 with the proviso that n and m are not both 0.

In formula (III) X and Y represent, independent from each other, an olefinic residue of the general structure:
$R_1R_2C=CR_3-$; $R_1R_2C=CR_3-O-$; or $R_1R_2C=CR_3-CR_4R_5-O-$ with $R_1$, $R_2$, $R_3$, $R_4$ and $R_5$ being independently from each other F or H.

Rf₂ in formula (III) has the same meaning as in formula (I) or (II).

Examples of bisolefins according to formula (I) include but are not limited to: $CF_2=CF-CF_2-O-CF_2-CF=CF_2$, $CH_2=CF-CF_2-O-CF_2-CF=CF_2$, $CH_2=CF-CF_2-O-CF_2-CF=CH_2$.

Examples of bisolefins according to formula (II) include but are not limited to: $CF_2=CF-CF_2-O-Rf_1-O-CF_2-CF=CF_2$, $CF_2=CF-CF_2-O-Rf_1-O-CF_2-CF=CH_2$, $CH_2=CF-CF_2-O-Rf_1-O-CF_2-CF=CH_2$, $CF_2=CF-CF_2-O-Rf_2-O-CF_2-CF=CF_2$, $CF_2=CF-CF_2-O-Rf_2-O-CF_2-CF=CH_2$, $CH_2=CF-CF_2-O-Rf_2-O-CF_2-CF=CH_2$.

Typical examples of Rf₁ include but are not limited to: $CF_2$, $(CF_2)_n$, with n being from 2 to 8, $CF_2-O-CF_2$, $CF_2-O-CF_2-CF_2$, $CF(CF_3)$, $(CF_2)_2-O-CF(CF_3)-CF_2$, $CF(CF_3)-CF_2-O-CF(CF_3)$, $(CF_2)_2-O-CF(CF_3)-CF_2-O-CF(CF_3)-CF_2-O-CF_2$ etc.

Typical examples of Rf₂ include but are not limited to phenyl-, mono-, di-, tri- or tetrafluoro-phenyl residues with the olefinic residues being linked via the ortho, para or meta. Other typical examples of Rf₂ include fluorinated, perfluorinated or non-fluorinated phenoxyphenyl residues or fluorinated, non-fluorinated or perfluorinated (1,1-ditrifluoromethyl benzyl)phenyl residues. These residues may also be substituted. Typical substituents include non-fluorinated, fluorinated or perfluorinated phenyl or phenoxy residues or perfluorinated alkyl (for example, $-CF_3$, $-CF_2CF_3$, etc. groups) or perfluorinated alkoxy or polyoxy groups (for example, $-O-CF_3$, $-O-CF_2-CF_3$, or $-O-CF_2-O-CF_3$, etc. groups).

Examples of bisolefins according to formula (III) include but are not limited to: $H_2C=CH-Rf_2-CH=CH_2$, $F_2C=CH-Rf_2-CH=CF_2$, $H_2C=CH-O-Rf_2-O-CH=CH_2$, $H_2C=CH-O-Rf_2-O-CH_2-CH=CH_2$, $F_2C=CF-Rf_2-CF=CF_2$, $F_2C=CF-O-Rf_2-CF=CF_2$, $F_2C=CF-O-Rf_2-O-CF=CF_2$, $F_2C=CF-CF_2-O-Rf_2-O-CF=CF_2$, $F_2C=CF-CF_2-O-Rf_2-O-CF_2-CF=CF_2$, $H_2C=CF-Rf_2-CF=CF_2$, $H_2C=CH-O-Rf_2-O-CF_2-CF=CF_2$, $H_2C=CH-O-Rf_2-CF=CF_2$, $F_2C=CF-O-Rf_2-O-CF=CF_2$, $H_2C=CF-CF_2-O-Rf_2-O-CF=CF_2$, $H_2C=CF-CF_2-O-Rf_2-O-CF_2-CF=CH_2$ etc.

Typical examples of Rf₂ are the same as described for Rf₂ in connection with formula (II) above. Preferably, Rf₂ is phenyl, phenoxyphenyl, (1,1,-ditrifluoromethyl benzyl)phenyl.

Fluorinated Monoolefins

Typical monomers used for the preparation of the fluoropolymer are fluorinated monoolefins, such as tetrafluoroethylene (TFE), hexafluoropropylene (HFP), vinylidene fluoride (VDF), chlorotrifluoroethylene (CTFE), fluorinated or perfluorinated allyl ether, fluorinated or perfluorinated vinyl ether, such as, for example, perfluoromethyl vinyl ether (PMVE), perfluoropropyl vinyl ether (PPVE-1) or perfluoroisopropyl vinyl ether, or perfluoroalkoxy vinyl or allyl ether or perfluoropolyalkoxy vinyl or allyl ether. Examples of suitable perfluorovinyl ether include those that correspond to the formula:

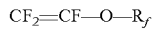

wherein $R_f$ represents a perfluorinated aliphatic group that may contain one or more oxygen atoms. Other examples of suitable perfluorinated vinyl ether correspond to the formula:

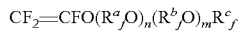

wherein $R^a_f$ and $R^b_f$ are different linear or branched perfluoroalkylene groups of 1 to 6 carbon atoms, in particular 2 to 6 carbon atoms, m and n are independently 0 to 10 and $R^c_f$ is a perfluoroalkyl group of 1 to 6 carbon atoms. Specific examples of perfluorinated vinyl ethers include PMVE, PPVE-1, PPVE-2, perfluoro-3-methoxy-n-propylvinyl ether, perfluoro-2-methoxy-ethylvinyl ether and $CF_3$—$(CF_2)_2$—O—$CF(CF_3)$—$CF_2$—O—$CF(CF_3)$—$CF_2$—O—CF=$CF_2$.

In addition to the fluorinated monoolefins, non-halogenated olefins, such as for example, ethylene (E) or propylene (P) may be used in the preparation of the fluoropolymers.

Fluoropolymers

The present invention relates to melt-processible fluoropolymers. A fluoropolymer is considered melt-processible if the melt viscosity of the polymer is low enough such that the polymer can be processed in conventional extrusion equipment used to extrude polymers. This typically requires that the melt viscosity at the processing temperature be no more than $10^6$ Pa*s, preferably $10^2$ to $10^5$ Pa*s. Typical processing temperatures are at or above the melting point of the polymer and are, for example, from about 100° C. to about 400° C.

Melt-processible fluoropolymers may be amorphous or may have (substantial) crystallinity. Typically, crystalline or partially crystalline polymers have a distinct melting point and are generally known as 'fluorothermoplasts'. They typically have a melting point of between about 100° C. and about 320° C. or from about 200° C. to about 270° C.

Fluoropolymers that are amorphous do not have a distinct and detectable melting point. They are typically used to make fluoroelastomers by curing or vulcanizing the fluoropolymer. Therefore, the amorphous polymers may contain cure-sites which can react to form a three dimensional cross-linking network. Typical cure-sites are bromine, iodine or nitrile residues. These residues react with peroxide curing agents to cross-link the polymers. Therefore, bromine, iodine or nitrile group containing olefins monomers may be used in the preparation of the polymer (typically in an amount of up to 1 or up to 0.5% by weight of the total monomer composition. Although the elastomeric properties generally are obtained after curing, fluoropolymers used for making fluoroelastomers are often also referred to as 'fluoroelastomers'.

The fluoropolymers may be perfluorinated or partially fluorinated. In a perfluorinated polymer all hydrogen atoms in the polymer backbone have been replaced by fluorine atoms, however, catenary heteroatoms, such as O, S or N (preferably O) may also be present. In a partially fluorinated polymer not all hydrogen atoms in the polymer backbone have been replaced by fluorine atoms, that is, the polymer backbone contains carbon-hydrogen bonds. Also a partially fluorinated polymer may contain catenary heteroatoms such as O, S or N (preferably O). Fluoroelastomers are generally partially fluorinated.

Examples of fluoropolymers according to the invention include copolymers of TFE and E (ethylene) (ETFE), copolymers of TFE and HFP (FEP), copolymers of TFE, HFP and VDF (THV) and perfluoroalkoxy copolymers (PFA). Other examples include fluoropolymers derived from TFE, E and HFP; TFE and P (propylene); VDF and HFP; VDF, HFP and E; VDF, HFP and P.

The term "copolymer" in connection with the present invention should generally be understood to mean a polymer comprising repeating units derived from the recited monomers without excluding the option of other further repeating units being present that derive from other monomer not explicitly recited. Accordingly, for example, the term 'copolymer of A and B' includes binary polymers of A and B as well as polymers that have further monomers other than A and B, such as for example terpolymers. The terms 'bipolymer' or 'terpolymer' etc is understood to be limiting to the presence of repeating units made up from a binary (A and B) or ternary (A, B and C) monomer composition.

The fluoropolymers provided herein do not have a linear structure but contain long chain branches. The presence of long chain branches in a polymer can be determined by various rheological experiments. For example, the level of branching or non-linearity can be characterized through the long chain branching index (LCBI). The LCBI can be determined as described in R. N. Shroff, H. Mavridis; *Macromol.*, 32, 8464-8464 (1999) & 34, 7362-7367 (2001) according to the equation:

$$LCBI = \frac{\eta_{0,br.}^{1/a}}{[\eta]_{br.}} \cdot \frac{1}{k^{1/a}} - 1 \qquad \text{eq. 1}$$

In the above equation, $\eta_{0,br.}$ is the zero shear viscosity (units Pa*s) of the branched fluoropolymer measured at a temperature T and $[\eta]_{br.}$ is the intrinsic viscosity (units ml/g) of the branched fluoropolymer at a temperature T' in a solvent in which the branched fluoropolymer can be dissolved and a and k are constants. These constants are determined from the following equation:

$$\eta_{0,lin} = k \cdot [\eta]_{lin}^a. \qquad \text{eq. 2}$$

wherein $\eta_{0,lin}$ and $[\eta]_{lin}$ represent respectively the zero shear viscosity and intrinsic viscosity of the corresponding linear fluoropolymer measured at the respective same temperatures T and T' and in the same solvent. Thus, the LCBI is independent of the selection of the measurement temperatures and solvent chosen, provided, of course, that the same solvent and temperatures are used in equations 1 and 2. The LCBI of the fluoropolymer may, for instance, have a value of at least about 0.1. The LCBI of the fluoropolymer may be at least about 0.2, at least about 0.3, or even at least about 0.4. The LCBI may be less than about 5, less than about 2.0 or less than about 0.1. Generally, the LCBI may be from about 0.1 up to about 5, for instance from about 0.2 to about 2.0.

An alternative method for determining the presence of long chain branches relies on the calculation of critical relaxation coefficients. This method is particularly suitable for unsoluble polymers. As disclosed by Wood-Adams et al. (Macromolecules 2000, 33, No. 20, 7489-7499), when plotting the phase angle δ versus the measurement frequency ω, polymers having long chain branches exhibit a plateau or additional curvature in the function of δ(ω) while linear polymers do not. When the polymer is linear the resulting plot only has a single curvature (compare Stange et al., Macromolecules 2007, 40, 2409-2416, FIG. 6 were the phase angle was plotted versus the shear modulus instead of the angular frequency (ω) but a similar curve is obtained when plotting the phase angle (δ) versus the angular frequency (ω)). The critical relaxation exponent n can be obtained by dividing the phase angle at gel point (δc) by 90°, that is, n=δc/90°. The phase angle at gel point (δc) is the angle at which, in case of long chain branches being present, the δ(ω)-function plateaus or forms a second curvature, that is, where the first derivative of the plot has its maximum and/or where the 2nd derivative passes zero. A representative plot of the function δ(ω) of a polymer having long-chain branches is shown in FIG. 1. According to García-Franco et al. (Macromolecules 2001, 34, No. 10, 3115-3117), the plateau in the afore-mentioned δ(ω)-function will shift to lower phase angles δ when the amount of LCBs in the polymer increases. The closer n is to 1, the fewer long chain branches are present. The critical relaxation exponent n for the fluoropolymers disclosed herein typically is less than 1 and more than 0. Generally, n will be between 0.3 and 0.92, preferably between 0.35 and 0.85.

Applications of the Fluoropolymers

Typical applications of the fluoropolymers include, for example, coating applications, for example coating of outdoor fabrics, and use as insulating materials, for example in cable and wire insulation. Further applications of the fluoropolymers include making of tubes (for example, fuel tubes), extrusion of films and injection molded articles. Therefore, the invention also relates to shaped articles containing the fluoropolymers such as cables, wires, films, blow molded articles, injection molded articles and coated articles.

Preparation of the Fluoropolymers

The fluoropolymers described herein may be obtained by polymerizing the monomers in the presence of the modifiers. Known polymerization techniques including solvent (slurry) polymerization, suspension polymerization, microemulsion, polymerization in supercritical media (for example, $CO_2$) or aqueous emulsion polymerization may be used. Seed polymerization, pre-emulsification, for example of the modifiers or of the monomers, may also be used in the polymerization.

The reactor vessel for use in the aqueous emulsion polymerization process is typically a pressurizable vessel capable of withstanding the internal pressures during the polymerization reaction. Typically, the reaction vessel will include a mechanical agitator, which will produce thorough mixing of the reactor contents and heat exchange system. Any quantity of the fluoromonomer(s) may be charged to the reactor vessel. The monomers may be charged batch-wise or in a continuous or semi-continuous manner. The independent rate at which the monomers are added to the kettle will depend on the consumption rate of the particular monomer with time. Preferably, the rate of addition of monomer will equal the rate of consumption of monomer, that is conversion of monomer into polymer.

In case of aqueous emulsion polymerization, the reaction kettle is charged with water, the amounts of which are not critical, to provide an aqueous phase. To the aqueous phase is generally also added a fluorinated surfactant, typically a nontelogenic fluorinated surfactant. Of course, methods employing polymerization methods free of added fluorinated surfactant are also suitable. When used, a fluorinated surfactant is typically used in amount of 0.01% by weight to 1% by weight. Suitable fluorinated surfactants include any fluorinated surfactant commonly employed in aqueous emulsion polymerization. Particularly preferred fluorinated surfactants are those that correspond to the general formula:

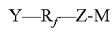

wherein Y represents hydrogen, Cl or F; $R_f$ represents a linear or branched perfluorinated alkylene having 4 to 10 carbon atoms; Z represents $COO^-$ or $SO_3^-$ and M represents an alkali metal ion or an ammonium ion. Particular fluorinated surfactants for use in this invention are the ammonium salts of perfluorooctanoic acid and perfluorooctane sulphonic acid. Mixtures of fluorinated surfactants can also be used. Also contemplated for use in the preparation of the polymers described herein are fluorinated surfactants of the general formula:

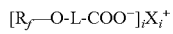

wherein L represents a linear partially or fully fluorinated alkylene group or an aliphatic hydrocarbon group, $R_f$ represents a linear partially or fully fluorinated aliphatic group or a linear partially or fully fluorinated group interrupted with one or more oxygen atoms, $X_i^+$ represents a cation having the valence i and i is 1, 2 and 3. Specific examples are described in US 2007/0015937.

Also contemplated for use in the preparation of the polymers described herein are fluorinated polyether surfactants, such as described in EP 1,189,953.

A chain transfer agent may also be charged to the reaction kettle. Useful chain transfer agents include $C_2$ to $C_6$ hydrocarbons such as ethane, alcohols, ethers, esters including aliphatic carboxylic acid esters and malonic esters, ketones and halocarbons. Particularly useful chain transfer agents are dialkylethers such as dimethyl ether and methyl tertiary butyl ether. Additions of chain transfer agent in a continuous or semi-continuous way during the polymerization may also be carried out. For example, a fluoropolymer having a bimodal molecular weight distribution is conveniently prepared by first polymerizing fluorinated monomer in the presence of an initial amount of chain transfer agent and then adding at a later point in the polymerization further chain transfer agent together with additional monomer. Accordingly, the fluoropolymer may have a monomodal, bimodal or multimodal molecular weight distribution.

The polymerization is usually initiated after an initial charge of monomer by adding an initiator or initiator system to the aqueous phase. For example, peroxides can be used as free radical initiators. Specific examples of peroxide initiators include, hydrogen peroxide, diacylperoxides such as diacetylperoxide, dipropionylperoxide, dibutyrylperoxide, dibenzoylperoxide, benzoylacetylperoxide, diglutaric acid peroxide and dilaurylperoxide, and further water soluble peracids and water soluble salts thereof such as for example ammonium, sodium or potassium salts. Examples of peracids include peracetic acid. Esters of the peracid can be used as well and examples thereof include tertiary-butylperoxyacetate and tertiary-butylperoxypivalate. A further class of initiators that can be used are water soluble azo-compounds. Suitable redox systems for use as initiators include for example a combination of peroxodisulphate and hydrogen sulphite or disulphite, a combination of thiosulphate and peroxodisulphate or a combination of peroxodisulphate and hydrazine. Further initiators that can be used are ammonium-, alkali- or earth alkali salts of persulfates, permanganic or manganic acid or manganic acids. The amount of initiator employed is typically between 0.03 and 2% by weight, preferably between 0.05 and 1% by weight based on the total weight of the polymerization mixture. The full amount of initiator may be added at the start of the polymerization or the initiator can be added to the polymerization in a continuous way during the polymerization until a conversion of 70 to 80%. One can also add part of the initiator at the start and the remainder in one or separate additional portions during the polymerization. Accelerators such as for example water-soluble salts of iron, copper and silver may also be added.

During the initiation of the polymerization reaction, the sealed reactor kettle and its contents are conveniently preheated to the reaction temperature. Polymerization temperatures may be from 20° C., from 30° C., or even from 40° C. and may further be up to 100° C., up to 110° C., or even up to 150° C. The polymerization pressure may range, for instance, from 4 to 30 bar, in particular from 8 to 20 bar. The aqueous emulsion polymerization system may further comprise auxiliaries, such as buffers and complex-formers.

The amount of polymer solids that can be obtained at the end of the polymerization is typically at least 10% by weight, or even at least 20% by weight, and up to 40% by weight, and even up to 45% by weight; and the average particle size of the resulting fluoropolymer is typically between 50 nm and 500 nm.

The modifier may be added to the polymerization vessel in portions or in a continuous way. The modifier may be fed to the polymerization from a separate inlet or storage cylinder. Alternatively, a mixture of the modifier with a monomer may be used to feed the modifier to the polymerization. The latter method may provide improved homogeneous incorporation of the modifier into the fluoropolymer leading to a more uniform distribution of long chain branches.

In one embodiment of the invention the modifier and one or more non-halogenated olefin, such as for example, ethylene or propylene, are used in the polymerization. This way the incorporation of the modifier into the polymer may be improved. Typically, the non-halogenated olefin may be used in an amount of up to about 20% or up to about 30% wt based on the total amount of monomers used.

The modifier is used in an effective amount to achieve the desired degree of long chain branching. The modifiers may be used in fairly low levels to avoid excessive branching to occur during polymerization. The amount of modifier typically used in the polymerization to cause a desired amount of branching of the fluoropolymer depends on the nature of the modifier and on the polymerization conditions such as for example, reaction time and temperature. The optimal amount of modifier can be readily determined by the person skilled in the art, for instance by determining the rheological properties of the resulting polymer (for example, by determining the degree of long chain branching, which can be expressed as LCBI or relaxation exponent). Generally, the amount of modifier may be less than 1% by weight or from 0.01%, or even from 0.05%, and up to 0.25% or even up to 0.4% or up to 0.8%. The percentages are by weight based on the total weight of monomers fed to the polymerization.

Work up procedures of the fluoropolymers may include known methods, such as for example, coagulation, agglomeration, decantation, ultrafiltration, etc. The fluoropolymers may also be subjected to post treatments, such as post-fluorination or treatment with gaseous ammonia for removing unstable endgroups.

Instead of aqueous emulsion polymerization other polymerization techniques may be used. As an example solvent polymerization is described. Solvent (slurry) polymerization comprises introducing at least one fluorinated monomer into a reactor containing a hydro fluorocarbon (HFC) solvent and water and polymerizing the monomer to produce a fluoropolymer slurry. Typically, shear rates of 10 to 1000 1/s are maintained during the reaction. Generally, a flow field is developed in the reactor using a mixer that imparts both a tangential and an axial flow component. The reactor agitator may be selected from a double planetary mixer and a coaxial turbine double helical ribbon mixer. In the case of the coaxial mixer, the double helical ribbon agitator may operate at a slower speed (as measured in revolutions per minute) than that of the turbine agitator. The double helical ribbon agitator and the turbine agitator of the coaxial mixer may operate with turbine and double helical ribbon agitators in opposed rotation to produce flow patterns of the solvent and water from each of the agitators in opposed directions. The coaxial turbine agitator may have multiple stages. The coaxial turbine double helical ribbon mixer may have a double helical ribbon agitator diameter to reactor internal diameter ratio of greater than 0.90 or even greater than 0.99. The agitation system may include, for example, double planetary mixers of the type exemplified by "DPM 10" to "DPM 750", commercially available from Charles Ross and Company (Hauppaugee, N.Y.) and a coaxial turbine double helical ribbon mixer of the type "KOAX 2035", commercially available from EKATO Rühr and Mischtechnik GmbH (Schopfheim, Germany).

The solvent slurry process may include separating the fluoropolymer and water from the solvent, agglomerating the fluoropolymer, drying the fluoropolymer and reusing the solvent for another process. Ingredients (modifiers, initiators, chain transfer agents) and work up steps already described in relation to the aqueous emulsion polymerization can also be used on the solvent polymerization.

Typically, the solvent may be a hydrofluoroether (HFE) solvent. The HFE solvent may have a boiling point of from 50° C. to 200° C. The HFE solvent may be a blend of two or more different HFEs. The amount of water present is typically from about 1:10 to 10:1 based on the total weight of the monomers added to the polymerization medium. The amount of solvent may be from about 1:20 to 20:1 both based on the total weight of monomers added to the polymerization medium.

Useful solvents include but are not limited to $R_fOCH_3$ where $R_f$=C4 to C6, $R_fOC_2H_5$ where $R_f$=C4 to C6, $HCF_2—CF_2—O—CH_3$, $HCF_2—CF_2—O—CH_2—(CF_2)_n—X$ or $CF_3—CHF—CF_2—O—CH_2—(CF_2)_n—X$ or $(CF_3)_2CH—CF_2—O—CH_2—(CF_2)_n—X$ where X=H or F and n=1-6, $HCF_2—CF_2—OCH_2—CF_2—CHF—CF_3$, $CF_3—CHF—CF_2—OCH_2—CF_2—CHF—CF_3$, $(CF_3)_2CF—CF(OCH_3)—CHF—CF_3$, $(CF_3)_2CHF—CF_2—O—CH_2—CF_2—CHF—CF_3$, $(CF_3)_2CF—CHF—CF(OCH_3)—CF_3$, $C_6H_5O—CF_2—CF_2H$, $C_6H_5O—CF_2—CHF—CF_3$, $C_6H_5O—CF_2—CH(CF_3)_2$, $R_f—CH_2—O—CF_2H$ where $R_f$ is selected from a linear partially fluorinated alkyl group, a linear partially fluorinated alkyl group interrupted with one or more oxygen atoms, a branched partially fluorinated alkyl group, a branched partially fluorinated alkyl group interrupted by one or more oxygen atoms, and a perfluorinated alkenyl group, $(CF_3)_2CH—CF_2—O—CH_3$, $(CF_3)_2C=CF—O—CH_3$, $CF_3CF_2CF_2O[CF(CF_3)CF_2O]_qCFHCF_3$, $CH_3OCF_2CFHCF_3$, $CF_3(CF_2)_xCFH(CF_2)_yCF_3$, $CF_3(CF_2)_xCH_2(CF_2)_yCF_3$, $CF_3(CF_2)_xCFHCH_2(CF_2)_yCF_3$, 1,1,2,2-tetrafluorocyclobutane, 1-trifluoromethyl-1,2,2-trifluorocyclobutane, 1,2-bis(perfluoro-n-butyl)ethylene and 2,2-bis(trifluoromethyl)-1,3-dioxolane, wherein q is 0-3; z is an integer of 2 to about 10; x is 0 or an integer of 1 to about 8; and y is independently 0 or an integer of 1 to about 8. Further HFC's comprise $X—(CF_2)_n—H$ with n=2 to 14 and X=H or F, $CF_3—(CF_2)_n—H$ with n=2 to 14, $R_f—(CH_2—CF_2)_n—X$ with n=1 to 4 and X=H and $R_f—(CHF—CF_2)_n—X$ with n=1 to 4 and X=F or H. Preferred are HFE's due to their low ozone depleting potential. Furthermore, liquid or liquefied monomers can be used as reaction medium, for example HFP, VDF, vinyl/allyl ethers such as $CF_2=CF-O-R_f$, $CF_2=CF-O-R_f-SO_2-F$ or $CF_2=CF-O-R_f-COOCH_3$. Polyether HFE's may also include $R_fO(CF_2CFCF_3)_nOCHFCF_3$ where n=0-4 and $R_f$ is perfluoroalkyl; $CF_3CHFO(CF_2)_nOCHFCF_3$ where n=1-6; $HCF_2(OCF_2)_nOCF_2H$ where n=1-6; and $HCF_2(OCF_2CF_2)_nOCF_2H$ where n=1-6.

These solvents can be easily prepared by reacting an olefin such as TFE or HFP with an appropriate alcohol under basic conditions as disclosed in U.S. Pat. No. 2,409,274 and J. Am. Chem. Soc. 73, 1785 ((1958). For example $R_f-CH_2O-CF_2H$ is obtainable by the reaction of the corresponding alcohol and R22 as described, for example, in J. of Fluorine Chem., 127, (2006), 400-404. Reactions of partially fluorinated alcohols with fluorinated olefins resulting in fluorinated ethers are described in Green Chemistry 4, 60 (2002). Branched fluoroolefins like perfluoroisobutene or dimeric HFP can be converted to partially fluorinated ethers as well using alcohols under basic conditions. Such reactions are demonstrated in Russian Chem. Rev. 53, 256 (1984), Engl. Ed., and Bull. Chem. Soc. Jap. 54, 1151 (1981).

HFEs may be made from the corresponding ketones or acid fluorides, for example, using the methods described in WO/9937598, U.S. Pat. No. 6,046,368, or J. Fluorine Chem. 126, 1578 (2006).

Tetrafluoroethyl ethers, carrying one or two $-OCHFCF_3$ groups, can be made based on HFPO oligomers or HFPO addition products to ketones or acid fluorides as disclosed in Angwandte Chemie Int. Ed. Engl. 24, 161 (1985).

The synthesis of $HCF_2O(CF_2)_nOCF_2H$ with n being one or two is disclosed in EP 879839. Other fluorinated ethers carrying one or more $-O-CF_2H$ group(s) are made according to J. Fluorine Chem. 127, 400 (2005) by reaction of fluorinated alcohols with $CF_2ClH(R22)$ in the presence of base.

Decarboxylation of primary carboxylic acids in the presence of proton donors results in the formation of $CF_2H$ groups as shown in J. Am. Chem. Soc. 75, 4525 (1953). This reaction creates fluorinated ethers as well as fluoroalkanes carrying $-CF_2H$ groups.

Tetrafluorocyclobutane and substituted partially fluorinated cyclobutanes are synthesized according to WO/0075092.

2,2-bis(trifluoromethyl)-1,3-dioxolanes can be made by methods described in J. Fluorine Chem. 9, 359 (1977).

Partially fluorinated alkanes can be obtained by telomerisation of fluorinated alkyl iodides with for example, vinylidene fluoride (Macromolecules 38, 10353 (2005)) and replacement or further reaction of the iodine atom.

The solvents used in the process can perform one or more than one function. They may be used as solvents for one or more of the constituents such as a monomer or free radical source (that is, the polymerization initiator) or the modifier, since adding such ingredients as solutions may be more convenient and/or accurate and may greatly facilitate a good dispersion of the reaction medium components (for example, initiators, chain transfer agents, and comonomers) employed. The solvent may also function as a solvent or swelling agent for the polymer that is made in the process. Additionally, mixtures including super critical monomers or supercritical fluids comprising materials such as HFP or $CHF_3$ can be used.

The polymerization temperature can be from 0° C. to up to 150° C. or even from 20° C. to 100° C., depending mainly on the used initiators. The polymerization pressure is usually from 2 bar up to 300 bar, or from 5 to 60 bar. The polymerization can be performed as batch process as well as continuously.

The solvents may be removed by distillation or evaporation. During evaporation or distillation, agglomeration of the fluoropolymer may occur with the continued application of stirring and heat. Typically free flowing, easy to handle agglomerates may be obtained.

EXAMPLE SECTION

Melting Peaks

Melting peaks of the fluororesins were determined according to ASTM 4591 by means of Perkin-Elmer DSC 7.0 under nitrogen flow and a heating rate of 10° C./min. The indicated melting points relate to the melting peak maximum.
Particle Size Determination:

The latex particle size determination was conducted by means of dynamic light scattering with a Malvern Zetazizer 1000 HSA in accordance to ISO/DIS 13321. The reported average particle size is the z-average. Prior to the measurements the polymer latexes obtained from the polymerizations were diluted with 0.001 mol/L KCl-solution. The measurement temperature was 20° C. in all cases.
Solution Viscosities:

Solution viscosities of diluted polymer solutions were determined on a 0.16% polymer solution in methylethylketone (MEK) at 35° C. in accordance to DIN 53726. A Connon-Fenske-Routine-Viskosimeter (Fa. Schott, Mainz/Germany) fulfilling ISO/DIS 3105 and ASTM D 2515 was used for the measurements, the Hagenbach correction was applied. The so-obtained reduced viscosities $\eta_{red.}$ were converted into the intrinsic viscosity $[\eta]$ using the Huggins equation ($\eta_{red.}=[\eta]+k_H\times[\eta]^2\times c$) and a Huggins constant of $k_H$=0.34.
LCBI:

The long chain branching index LCBI was calculated as described herein using the $[\eta]$ from solution viscosity and the $\eta_0$ from the melt rheology investigations described below. The values a and k along with the test conditions for some of the fluoropolymers that may be used in the melt-processible polymer composition are set forth in the following table:

| Polymer | test condition | a-value | k-value |
|---|---|---|---|
| $TFE_{39}/HFP_{11}/VDF_{50}$ | A | 5.3 | $2.5\times10^{-7}$ |
| $TFE_{24.5}/HFP_{23}/VDF_{52.5}$ | A | 5.3 | $3.8\times10^{-7}$ |
| $VDF_{78}/HFP_{22}$ | A | 5.3 | $1.3\times10^{-7}$ |
| polyvinylidene fluoride | B | 5.3 | $1.2\times10^{-7}$ |
| polyvinylidene fluoride | C | 5.3 | $2.2\times10^{-7}$ |

In the above table, the indexes to the monomer units in the polymer indicate the amount of the respective unit in mole % and the test conditions are as follows:
A: shear viscosity at 265° C. and the intrinsic viscosity in methyl ethyl ketone at 35° C.
B: shear viscosity at 230° C. and the intrinsic viscosity in dimethylformamide at 23° C.
C: shear viscosity at 230° C. and the intrinsic viscosity in dimethylformamide at 110° C.
Rheological Data of Fluoropolymer Melts:

A strain controlled ARES rheometer (Advanced Rheological Expansion System; 3ARES-13; Firmware version 4.04.00) of Rheometric Scientific/TA Instuments (Alzenau, Germany) equipped with a 2KFRT 200 force rebalance transducer (supplied by RheoService, Reichelsheim, Germany) with a force range of up to 200 g was used to perform the oscillatory shear flow measurements and to record the phase angle or viscosity of the molten fluoropolymers in frequency sweep experiments. The dynamic mechanical data were recorded in a nitrogen atmosphere in frequency sweep experiments using rotational plates having a 25 mm diameter parallel plate geometry. Unless stated otherwise a temperature of 265° C. was applied during the measurements. (If the polymer has a melting temperature above 265° C. measurements can be carried out at temperatures at which the polymer is in its molten form).

The thermal control of the oven was operated using the sample/tool thermal element. A strain typically ascending from 1 to 20% was applied.

Zero shear viscosities $\eta_0$, reported in Pa*s, were extrapolated from the viscosity function $\eta^*(\omega)$ (viscosity of the melt versus angular frequency applied to the rotating plate) using the 4 parameter Carreau fit function provided by the Orchestrator software (version 7.0.8.13).

Critical relaxation coefficients were determined by plotting the phase angle ($\delta$) obtained in sweep experiment using rotational plates versus the angular frequency applied to the first rotating plate ($\omega$) (the frequency at which the plate rotates). The critical relaxation exponent n is obtained by dividing the phase angle at gel point ($\delta c$) by 90°, that is, n=$\delta c$/90°. The phase angle at gel point ($\delta c$) is the angle at which the first derivative of the plot $\delta(\omega)$ has its maximum and/or the 2nd derivative passes zero.

Sintered samples having a thickness of 2 mm and a diameter of 23 mm were used for these measurements. Sintering was carried out in a hot press at a temperature of 170° C. The samples were heated up to 170° C. within 500 s, held under a pressure of 55 bar for 300 s and cooled down within 200 s.

Melt Flow Index:

The melt flow index (MFI), reported in g/10 min, was measured according to DIN EN ISO 1133 at a support weight of 5.0 kg. The MFI was obtained with a standardized extrusion die of 2.1 mm diameter and a length of 8.0 mm. Unless otherwise noted, a temperature of 265° C. was applied.

The following examples are offered to aid in a better understanding of the present invention. These examples are not to be construed as an exhaustive compilation of all embodiments of the present invention and are not unnecessarily construed as limiting the scope of this invention.

Example 1

In the following example, a long chain branched $TFE_{39}$/$HFP_{11}$/$VDF_{50}$ fluoropolymer was produced using divinylbenzene as modifier.

The oxygen free polymerization kettle with a total volume of 48.5 l equipped with an impeller agitator system was charged with 28.0 l deionized water, 2 g oxalic acid, 12 g ammonium oxalate and 252 g of a 30 weight % aqueous solution of perfluorooctanoate ammonium salt and then heated up to 60° C. The agitation system was set to 240 rpm. The kettle was further charged with ethane to a pressure of 2.0 bar absolute, followed by 1000 g hexafluoropropylene (HFP) to a pressure of 8.5 bar absolute, followed by 240 g vinylidenefluoride (VDF) to 12.9 bar absolute followed by 410 g tetrafluorethylene (TFE) to 16.8 bar absolute reaction pressure. The polymerization was initiated by the addition of 65 ml 0.5% aqueous potassium permanganate ($KMnO_4$) solution. A continuous feed of $KMnO_4$-solution was maintained with a feed rate of 144 ml/h. When the reaction started, the reaction temperature was kept at 60° C. and the reaction pressure of 16.8 bar absolute was maintained by feeding TFE, VDF and HFP into the gas phase with a feeding ratio of HFP (kg)/TFE (kg) of 0.423 and a feeding ratio VDF (kg)/TFE (kg) of 0.820.

6 g (46 mmol) of divinylbenzene was also fed into the kettle during the course of the polymerization. Prior to use, technical grade divinylbenzene (~80% by GC) commercially available from FLUKA/Riedel-deHaen was purified by distillation, dissolved in 16 g tert-butanol (available from FLUKA/Riedel-deHaen) and stored in a heated (35° C.) glass tube. The line for feeding the divinylbenzene/tert-butanol solution was also heated to 35° C. to avoid crystallization of the tert-butanol. After 338 minutes 3510 g of TFE were fed and the monomer valves were closed. After 7 minutes the pressure in the kettle was down to 14.0 bar. Then the kettle was vented and flushed with $N_2$ in three cycles. The resulting polymer dispersion had a solid content of 21.3% by weight. The latex particles had an average diameter of 78 nm (determined by dynamic light scattering). 1000 ml of the dispersion were passed through a glass column (40 cm length×30 mm diameter) containing DOWEX 650C cation exchange resin (Dow Chemical Co.) and freeze coagulated at −18° C. in a refrigerator over night. After defrosting, the so-obtained agglomerate was washed five times with deionized water under vigorous agitation and then dried in an oven at 130° C. for 12 hours. The physical characteristics of the so-obtained polymer agglomerate are shown below:

| | |
|---|---|
| Melting point maximum | 121° C. |
| MFI (265/5) | 9.8 g/10 min |
| Zero shear viscosity at 265° C. | $5.3 \times 10^3$ Pa * s |
| Reduced viscosity (MEK @ 35° C.) | 85 ml/g |
| Intrinsic viscosity (MEK @ 35° C.) | 81 ml/g |
| LCBI | 0.1 |
| Phase angle at gel point ($\delta c$) | 70° |
| Relaxation exponent | 0.78 |

Example 2

In the following example, a long chain branched HFP/VDF fluoropolymer was produced using a perfluorinated diallyl ether as modifier.

The same oxygen free polymerization kettle of example 1 was charged with 29.0 l deionized water and heated up to 70° C. The agitation system was set to 240 rpm and the kettle was charged with 3.5 g dimethylether ($Me_2O$) and 1000 g hexafluoropropylene (HFP) to a pressure of 8.0 bar absolute and with 440 g vinylidenefluoride (VDF) to 15.5 bar absolute reaction pressure. In the following, 25 g of $F_2C=CF-CF_2-O-(CF_2)_6-O-CF_2-CF=CF_2$ (available from ANLES; St. Petersburg, Russia) was charged into the HFP storage cylinder and dispersed into 5,300 g HFP under turbulent flow conditions. Then, the polymerization was initiated by adding 40 g of ammonium peroxodisulfate (APS) dissolved in 120 ml water. When the reaction started, the reaction temperature was maintained and the reaction pressure of 15.5 bar absolute was also maintained by feeding VDF and HFP into the gas phase with a feeding ratio of HFP (kg)/VDF (kg) of 0.653. When a total feed of 8,122 g VDF was reached after 220 min, the feed of monomers was interrupted by closing the monomer valves. Within 10 minutes, the monomer gas phase reacted down to a vessel pressure of 8.2 bar. Then the reactor was vented and flushed with $N_2$ in three cycles. The thus obtained 42.5 kg polymer dispersion had a solid content of 32.6% and the latex particles were 357 nm in diameter according to dynamic light scattering. 1.0 L of the polymer dispersion was freeze-coagulated over night in a refrigerator. After defrosting the material, the obtained sponge-like raw polymer was washed five times with demineralized water and the polymer was dried for 12 h in an oven at 130° C. The polymer was translucent and did not show any sign of discoloration.

The plot of the phase angle (δ) versus the angular frequency (ω) obtained from this sample is shown in FIG. 1.

The physical characteristics of the LCB-fluoropolymer of example 2 are shown below:

| MFI (265/5) | 9.9 g/10 min |
| Zero shear viscosity at 265° C. | $1.2 \times 10^4$ Pa * s |
| Reduced viscosity (MEK @ 35° C.) | 97 ml/g |
| Intrinsic viscosity (MEK @ 35° C.) | 92 ml/g |
| LCBI | 0.27 |
| Phase angle at gel point (δc) | 48° |
| Relaxation exponent | 0.53 |

The invention claimed is:

1. A fluoropolymer derived from at least
   (a) one or more fluorinated monoolefin monomers and
   (b) one or more fluorinated bisolefin monomers of the general formula

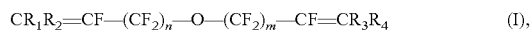   (I), with
   $R_1$, $R_2$, $R_3$, and $R_4$ being independently from each selected from $Rf_1$, F or H,
   $Rf_1$ being selected from the group consisting of $Rf_2$ or being a linear or branched perfluoroalkyl, perfluoroalkyl ether or perfluoroalkyl polyether residue and
   $Rf_2$ being a non-fluorinated or a fluorinated or a perfluorinated aryl, wherein $Rf_2$ may be non-substituted or substituted with
     one or more halogens other than F;
     one or more perfluorinated alkyl residue;
     one or more perfluorinated alkoxy residue;
     one or more perfluorinated poly oxy alkyl residue;
     one or more fluorinated, perfluorinated or non-fluorinated phenyl or phenoxy moieties or combinations thereof, and wherein the phenyl or phenoxy residues may be non-substituted or substituted with one or more perfluorinated alkyl, alkoxy or polyoxy alkyl residue or one or more halogens other than F or combinations thereof;
   n and m being independent from each other integers of from 1 to 6 wherein the fluoropolymer has a melting point of greater than about 100° C. and less than about 320° C.

2. The fluoropolymer according to claim 1, wherein the fluoropolymer has a long chain branch index (LCBI) of from about 0.1 to about 5.

3. The fluoropolymer according to claim 1, wherein said fluoropolymer is further derived from at least a non-halogenated olefin monomer selected from the group consisting of ethylene, propylene or a combination thereof.

4. The fluoropolymer according to claim 1, wherein the fluoropolymer is derived from 0.01% up to 0.8% by weight based on the total amount of monomers of the one or more fluorinated bisolefin monomers and up to about 30.0% by weight of a non-halogenated olefin selected from the group consisting of ethylene, propylene or combinations thereof.

5. The fluoropolymer according to claim 1, wherein the fluoropolymer is in the form of a melt at a temperature of 265° C. and has a critical relaxation coefficient between about 0.3 and 0.92 measured at a temperature of 265° C.

6. The fluoropolymer according to claim 1, wherein the fluoropolymer is in the form of a melt at a temperature of 372° C. and has a critical relaxation coefficient between about 0.3 and about 0.92 measured at a temperature of 372° C.

7. An article containing the fluoropolymer according to claim 1, wherein the article is selected from the group consisting of extruded articles, blow-molded articles or injection-molded articles.

8. The fluoropolymer according to claim 1, comprising 0.01% up to 0.8% by weight of the one or more fluorinated bisolefin monomers of the general formula (I).

9. A method for preparing a fluoropolymer said method comprising polymerizing one or more fluorinated monoolefin monomers in the presence of one or more fluorinated bisolefin monomers according to a general formula of

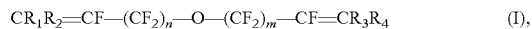   (I), with $R_1$, $R_2$, $R_3$, and $R_4$ being independently from each selected from $Rf_1$, F or H,
$Rf_1$ being selected from the group consisting of $Rf_2$ or being a linear or branched perfluoroalkyl, perfluoroalkyl ether or perfluoroalkyl polyether residue and
$Rf_2$ being a non-fluorinated or a fluorinated or a perfluorinated aryl, wherein $Rf_2$ may be non-substituted or substituted with
  one or more halogens other than F;
  one or more perfluorinated alkyl residue;
  one or more perfluorinated alkoxy residue;
  one or more perfluorinated poly oxy alkyl residue;
  one or more fluorinated, perfluorinated or non-fluorinated phenyl or phenoxy moieties or combinations thereof, and wherein the phenyl or phenoxy residues may be non-substituted or substituted with one or more perfluorinated alkyl, alkoxy or polyoxy alkyl residue or one or more halogens other than F or combinations thereof;
n and m being independent from each other integers of integers of from 1 to 6 wherein the fluoropolymer has a melting point of greater than about 100° C. and less than about 320° C.

10. The method of claim 9 wherein the one or more fluorinated monoolefin monomers are polymerized in the presence of up to about 10% by weight based on the total amount of monomers of a non-halogenated olefin monomer selected from the group consisting of ethylene, propylene or a combination thereof.

11. The method of claim 9 wherein the one or more fluorinated bisolefin monomers are present in an amount of up to about 0.8% by weight based on the total amount of monomers.

12. The method according to claim 9, comprising 0.01% up to 0.8% by weight of the one or more fluorinated bisolefin monomers of the general formula (I).

* * * * *

UNITED STATES PATENT AND TRADEMARK OFFICE
CERTIFICATE OF CORRECTION

PATENT NO. : 8,969,500 B2
APPLICATION NO. : 12/597022
DATED : March 3, 2015
INVENTOR(S) : Klaus Hintzer et al.

It is certified that error appears in the above-identified patent and that said Letters Patent is hereby corrected as shown below:

ON THE TITLE PAGE

First Page, Column 2 Item 56 (Other Publications)
Line 27, delete "Angwandte" and insert -- Angewandte --, therefor.

Page 2, Column 2 (Other Publications)
Line 7, after "Properties" insert -- of --.

Line 8, after "Engineering" delete "of".

Line 8, delete "242, 1991." and insert -- 1991. --, therefor.

IN THE SPECIFICATION

Column 2
Line 65, delete "$CR_3=CR_4R_5$" and insert -- $CR_3$—$CR_4R_5$ --, therefor.

Column 4
Line 32, delete "$CF_{25}$" and insert -- $CF_2$, --, therefor.

Line 62, delete "$CF_2$," and insert -- $CH_2$, --, therefor. (2nd occurrence)

Line 67, delete "(1,1,-" and insert -- (1,1- --, therefor.

Column 10
Line 18, delete "(Hauppaugee," and insert -- (Hauppauge, --, therefor.

Column 11
Line 30, delete "Angwandte" and insert -- Angewandte --, therefor.

Signed and Sealed this
Twenty-second Day of December, 2015

Michelle K. Lee
*Director of the United States Patent and Trademark Office*

CERTIFICATE OF CORRECTION (continued)
U.S. Pat. No. 8,969,500 B2

IN THE SPECIFICATION

Column 12
Line 17, delete "Zetazizer" and insert -- Zetasizer --, therefor.

Lines 26-27, Delete "Connon-Fenske-Routine-Viskosimeter" and insert
-- Cannon-Fenske-Routine-Viscometer --, therefor.

Line 61, delete "Instuments" and insert -- Instruments --, therefor.

Column 13
Line 58, delete "tetrafluorethylene" and insert -- tetrafluoroethylene --, therefor.

IN THE CLAIMS

Column 16
Lines 42-43 (approx.), in Claim 9, after "integers of" delete "integers of".